US 7,338,406 B2

(12) United States Patent
Shimoda (10) Patent No.: US 7,338,406 B2
(45) Date of Patent: Mar. 4, 2008

(54) SHIFT CONTROL APPARATUS AND METHOD FOR BELT TYPE CONTINUOUSLY VARIABLE TRANSMISSION

(75) Inventor: Azusa Shimoda, Aichi (JP)

(73) Assignee: Jatco Ltd, Shizuoka (JP)

(*) Notice: Subject to any disclaimer, the term of this patent is extended or adjusted under 35 U.S.C. 154(b) by 156 days.

(21) Appl. No.: 11/078,454

(22) Filed: Mar. 14, 2005

(65) Prior Publication Data
US 2005/0215393 A1 Sep. 29, 2005

(30) Foreign Application Priority Data
Mar. 26, 2004 (JP) ............................. 2004-091307

(51) Int. Cl.
*F16H 61/662* (2006.01)
(52) U.S. Cl. ......................................... 477/46
(58) Field of Classification Search .................. 477/46, 477/48, 49; 701/61, 62; 474/69, 70
See application file for complete search history.

(56) References Cited

U.S. PATENT DOCUMENTS

| 4,747,325 A | * | 5/1988 | Morimoto | 477/49 |
| 5,020,392 A | * | 6/1991 | Morimoto | 477/49 |
| 5,607,373 A | * | 3/1997 | Ochiai et al. | 477/46 |
| 5,790,968 A | * | 8/1998 | Kashiwabara et al. | 701/51 |
| 5,951,437 A | * | 9/1999 | Yuasa et al. | 477/46 |

FOREIGN PATENT DOCUMENTS

JP  2001-304389 A  10/2001

\* cited by examiner

*Primary Examiner*—Sherry Estremsky
*Assistant Examiner*—Edwin A Young
(74) *Attorney, Agent, or Firm*—Foley & Lardner LLP (57) ABSTRACT

In shift control apparatus and method for a belt-type continuously variable transmission, a shift ratio between the primary pulley and the secondary pulley is controlled, a shift speed is detected, the shift speed being a variation quantity of the shift ratio per unit of time; and an advance of the shift ratio control is suppressed to suppress the shift speed when a magnitude of the shift speed is equal to or larger than a predetermined value and a suppression quantity is set to suppress the advance of the shift ratio control so as to suppress the shift speed.

15 Claims, 8 Drawing Sheets

FIG.6A
ACTUAL SHIFT DUTY D

SHIFT CONTROL APPARATUS AND METHOD FOR BELT TYPE CONTINUOUSLY VARIABLE TRANSMISSION

BACKGROUND OF THE INVENTION

1. Field of the Invention

The present invention relates to shift control apparatus and method for a belt type continuously variable transmission which are capable of preventing a belt slip due to an abrupt shift.

2. Description of the Related Art

Recently, an attention has been paid to a continuously variable transmission which controls a shift ratio (or speed ratio) continuously in that a shift shock can be avoided or a superior fuel consumption efficiency can be achieved. Especially, many vehicles in which the continuously variable transmissions are equipped have been developed. The continuously variable transmission presently in a reduction into practice includes a belt type continuously variable transmission for a relatively low output engine and a toroidal type continuously variable transmission for a relatively high output engine. The belt type continuously variable transmission is constituted by a primary pulley linked to an output shaft of an engine, a secondary pulley linked to drive wheels, and a belt wound around both of the pulleys. A power generated by the engine is transmitted from the primary pulley to the secondary pulley via the belt and is transmitted to the drive wheels. At this time, a hydraulic (a secondary (pulley) pressure) set in accordance with a basic characteristic of the secondary pulley such as a transmission torque is acted upon the secondary pulley to provide a clamping force for the belt. A hydraulic (a primary pressure) acted upon the primary pulley is adjusted to control the shift ratio (the speed ratio) (or an effective radius ratio of each of the primary pulley and secondary pulley). Thus, a gear shift is carried out. In general, in such a gear shift control as described above, a target revolution speed of the primary pulley is set on the basis of a vehicle speed or an engine throttle opening angle and the primary pressure is controlled so that an actual revolution speed of the primary pulley is made coincident with the target revolution speed thereof. In other words, a controlled variable of the primary pressure is determined according to a deviation between the actual revolution speed of the primary pulley and the target revolution speed thereof. As the deviation between the actual revolution speed and the target revolution speed becomes large, the controlled variable of the primary pressure becomes large so that a shift speed (a variation speed) of the shift ratio becomes fast. Hence, if an abrupt depression on an accelerator pedal is carried out during an inertia driving with the accelerator pedal released, the target revolution speed is set to a high value in accordance with the throttle valve opening angle. Thus, the deviation between the actual revolution speed and the target revolution speed becomes abruptly large and the shift speed becomes extremely fast. At this time, although the fast shift speed makes a quick acceleration possible and this is desirable in terms of a shift performance, the extremely fast shift speed, in turn, causes the shift ratio to abruptly be varied so that a belt slip occurs. In the worst case, there is a possibility that the belt and the pulleys are damaged.

To prevent such a belt slip as described above, a Japanese Patent Application First Publication No. 2001-304389 published on Oct. 31, 2001 exemplifies a previously proposed shift control apparatus in which when the shift speed is equal to or faster than a preset predetermined value, an advance of the shift ratio control is suppressed so as to suppress the shift speed. Specifically, in the shift control apparatus in which a magnitude of the primary (pulley) pressure is corrected by means of a feedback control, when the shift speed is in excess of a threshold value placed in a vicinity to an upper limit shift speed below which the belt slip does not occur, a correction quantity (for example, an integration correction quantity, a proportional correction quantity, or a differential correction quantity) of a hydraulic control from among feedback correction quantities in a case where a time lag in a rise in actual revolution speed with respect to a variation in the primary pressure due to a mechanical response delay of the primary pulley is reset to zero. Thus, when the shift speed is equal to or below threshold value Vo, the correction of the feedback control can improve the shift performance. When the shift speed is in excess of threshold value Vo, the correction quantity of the feedback control is reduced and the rise in the shift speed can be suppressed.

SUMMARY OF THE INVENTION

However, there is a case where the previously proposed shift control apparatus disclosed in the above-identified Japanese Patent Application First Publication cannot suppress the shift speed. For example, in a case where, when the actual revolution speed of the primary pulley is slightly lower than the target revolution speed due to the response delay, the target revolution speed is abruptly increased and the feedback correction quantity is reduced so that the hydraulic controlled variable can also be reduced. Consequently, the rise in the shift speed can be suppressed. However, on the contrary, in a case where, when the actual revolution speed of the primary pulley is slightly higher than the target revolution speed, the target revolution is abruptly increased and the feedback correction quantity is given as a minus value. Hence, even if the feedback correction quantity is decreased, an effect of the suppression of the rise in the shift speed cannot be obtained.

It is, hence, an object of the present invention to provide shift control apparatus and method for belt continuously variable transmission which are capable of effectively preventing the belt slip along with an abrupt change in the shift ratio while securing the shift performance of the continuously variable transmission.

According to one aspect of the present invention, there is provided a shift control apparatus for a continuously variable transmission, comprising: a primary pulley; a secondary pulley; an endless belt wound on both of the primary and the secondary pulleys; a shift ratio controlling section that controls a shift ratio between the primary pulley and the secondary pulley; a shift speed detecting section that detects a shift speed, the shift speed being a variation quantity of the shift ratio per unit of time; and a shift speed suppression section that suppresses an advance of the shift ratio control by means of the shift ratio controlling section to suppress the shift speed when a magnitude of the shift speed is equal to or larger than a predetermined value, the shift speed suppression section setting a suppression quantity to suppress the advance of the shift ratio control so as to suppress the shift speed.

According to another aspect of the present invention, there is provided a shift control method for a continuously variable transmission, the continuously variable transmission comprising: a primary pulley; a secondary pulley; and an endless belt wound on both of the primary and the secondary pulleys, the shift control method comprising: controlling a shift ratio between the primary pulley and the secondary pulley; detecting a shift speed, the shift speed being a variation quantity of the shift ratio per unit of time; and suppressing an advance of the shift ratio control to suppress the shift speed when a magnitude of the shift speed is equal to or larger than a predetermined value, during the shift speed suppression, a suppression quantity being set to suppress the advance of the shift ratio control so as to suppress the shift speed.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention.

Figure 1:
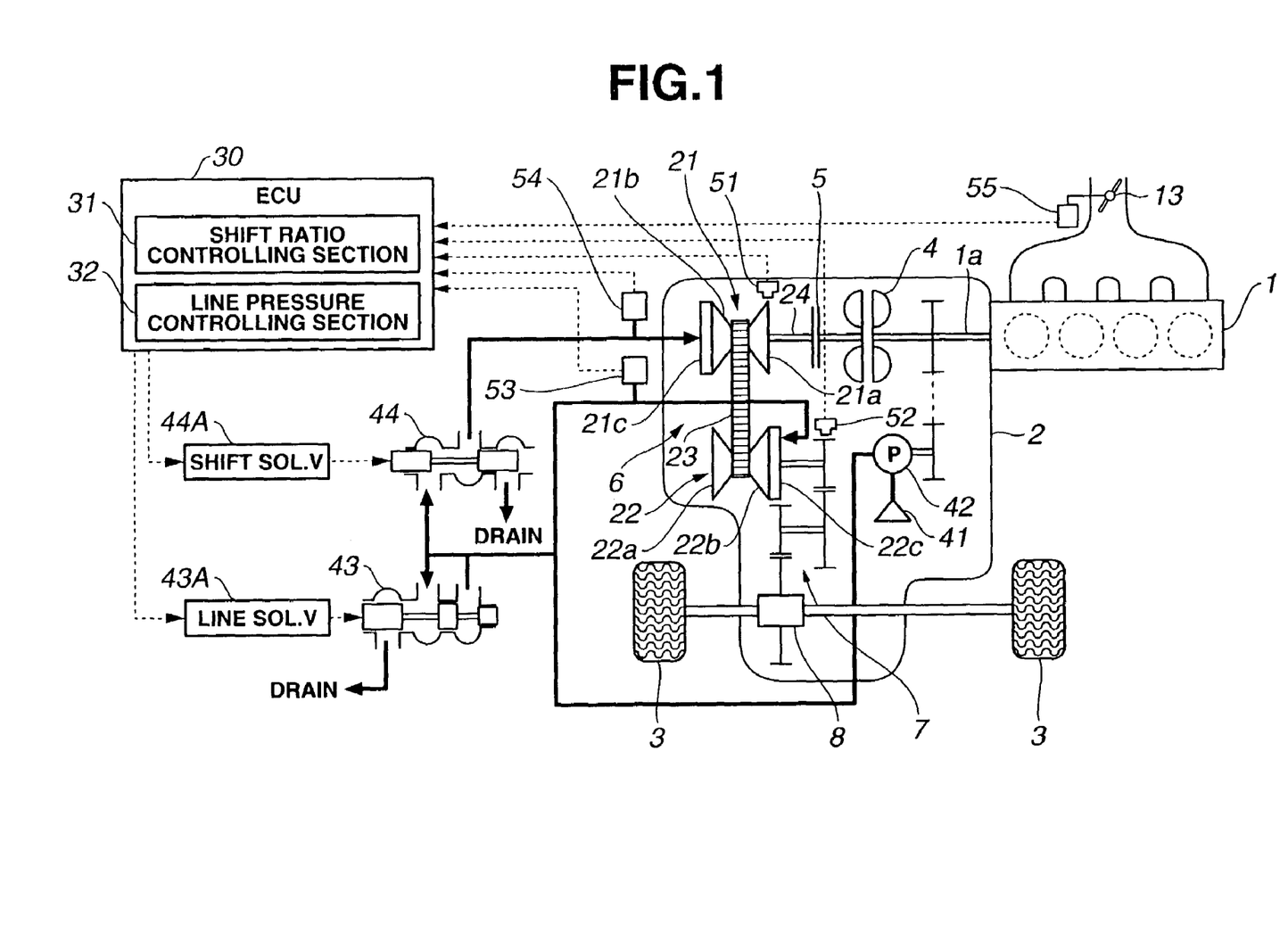
FIG. 1 is a system configuration view of a power transmission system and a control system of an automotive vehicle to which a shift control apparatus for a belt-type continuously variable transmission in a preferred embodiment according to the present invention is applicable.
Figure 2:
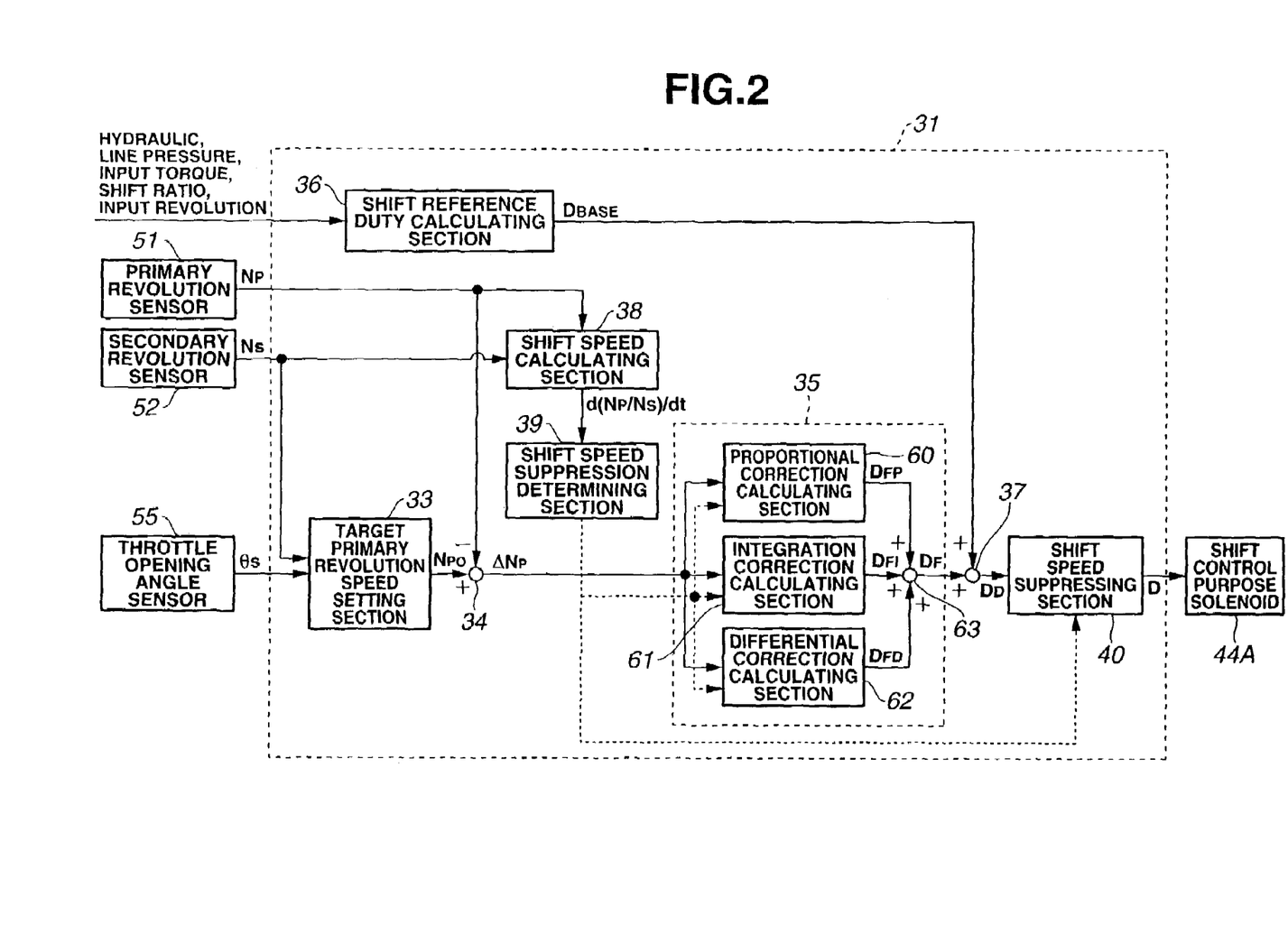
FIG. 2 is a functional block diagram for explaining functions of a shift control of the shift control apparatus in the preferred embodiment shown in FIG. 1.
Figure 3:
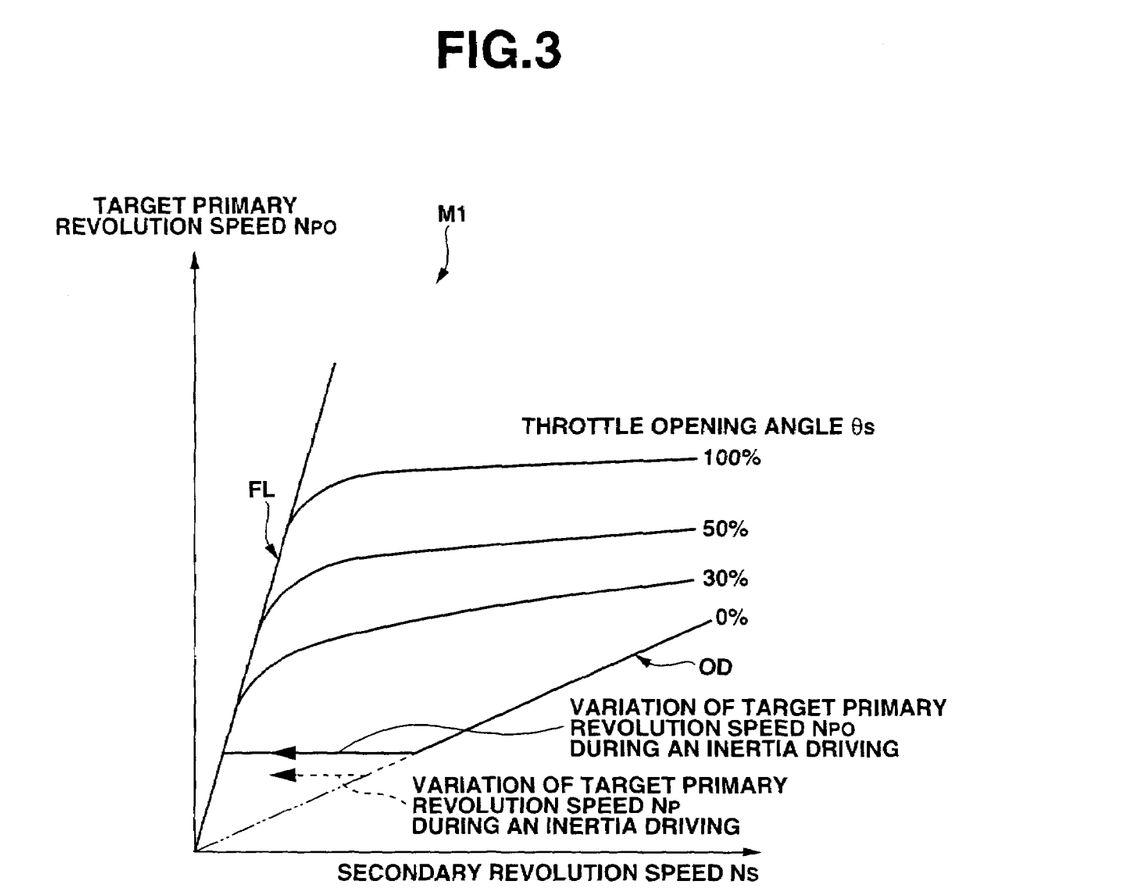
FIG. 3 is an example of a control map of the shift control in the shift control apparatus shown in FIG. 1.
Figure 4:
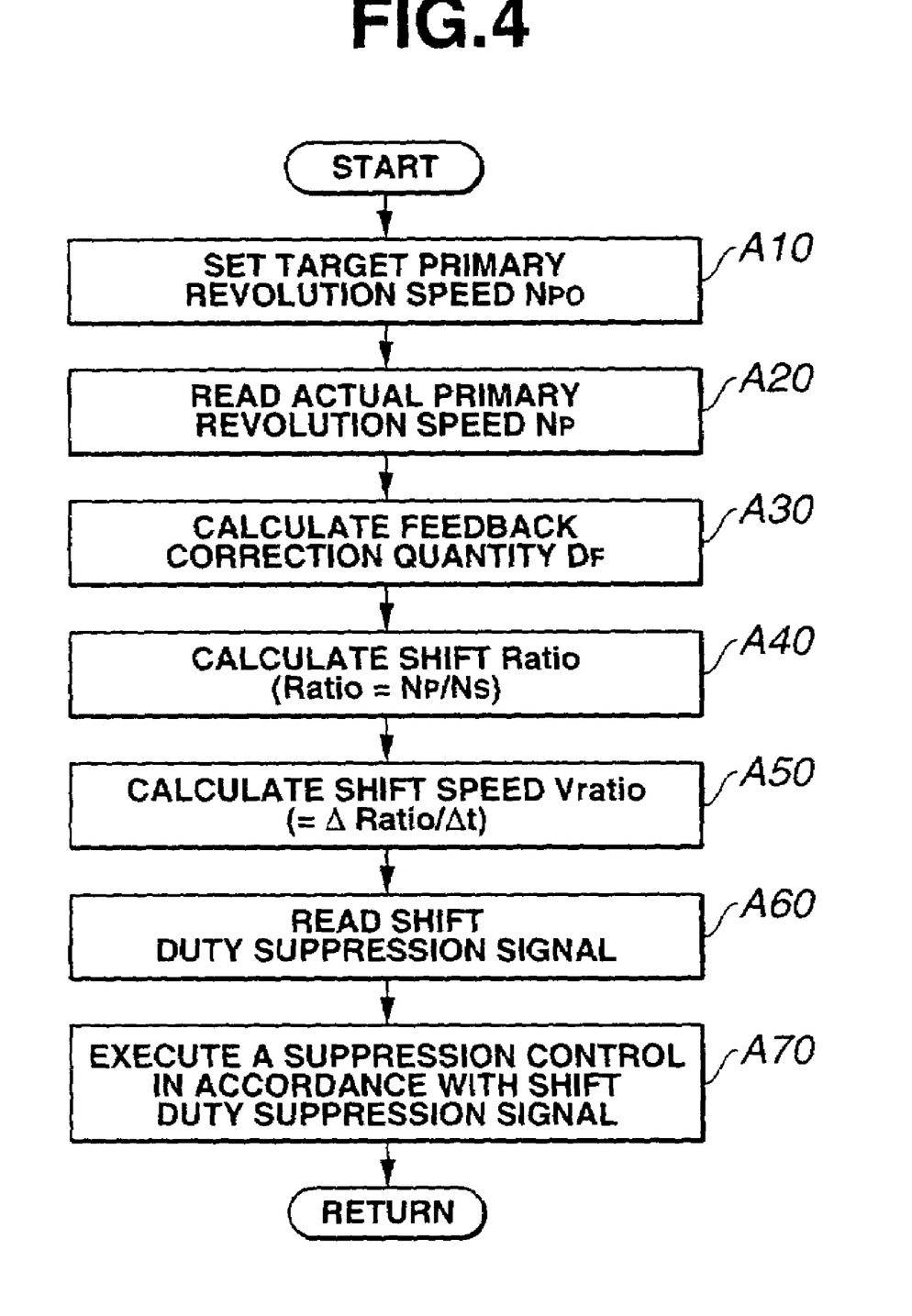
FIG. 4 is a control flowchart for explaining control contents of the shift control apparatus in the preferred embodiment shown in FIG. 1.
Figure 5:
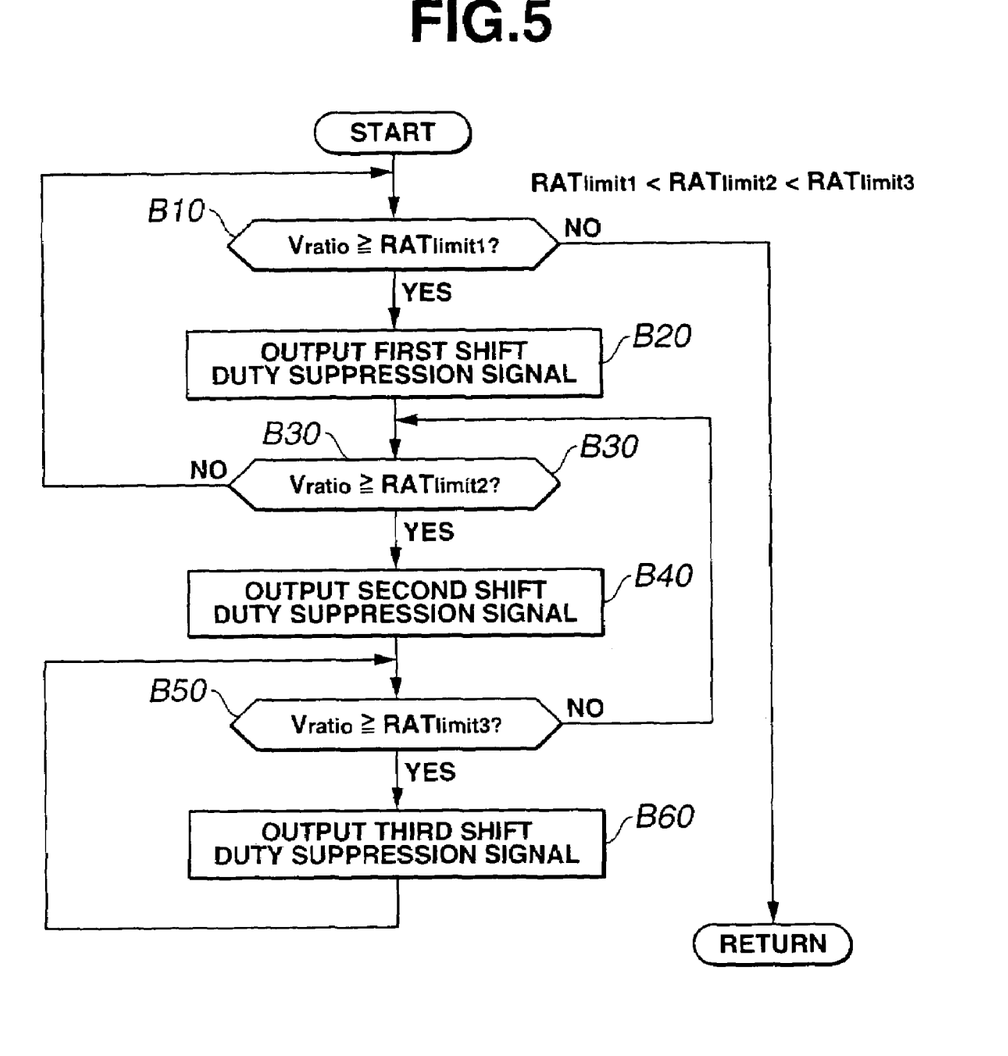
FIG. 5 is a control flowchart for explaining control contents of the shift control apparatus in the preferred embodiment shown in FIG. 1.
Figure 6A:
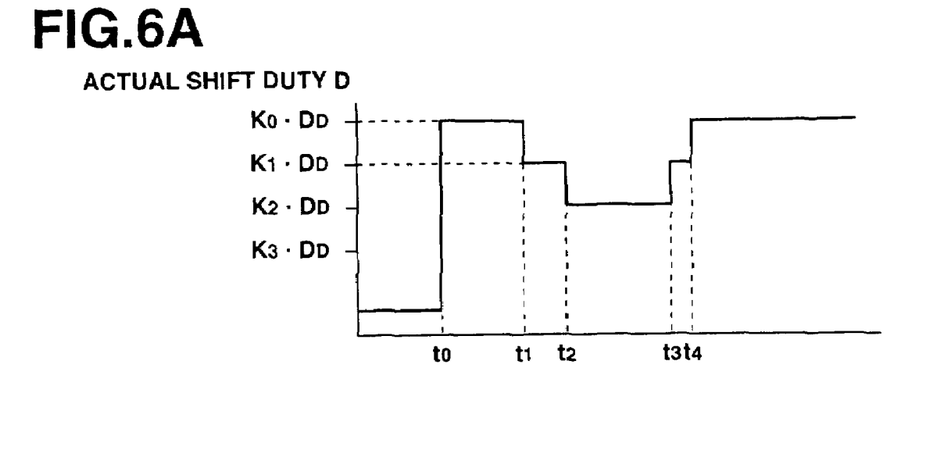
FIGS. 6A, 6B, and 6C show integrally a timing chart for explaining effects of the shift control of the shift control apparatus in the preferred embodiment shown in FIG. 1.
Figure 6B:
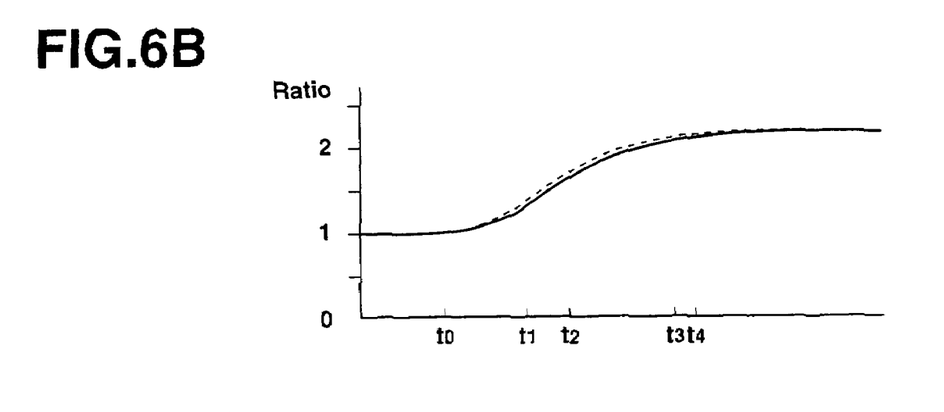
Figure 6C:
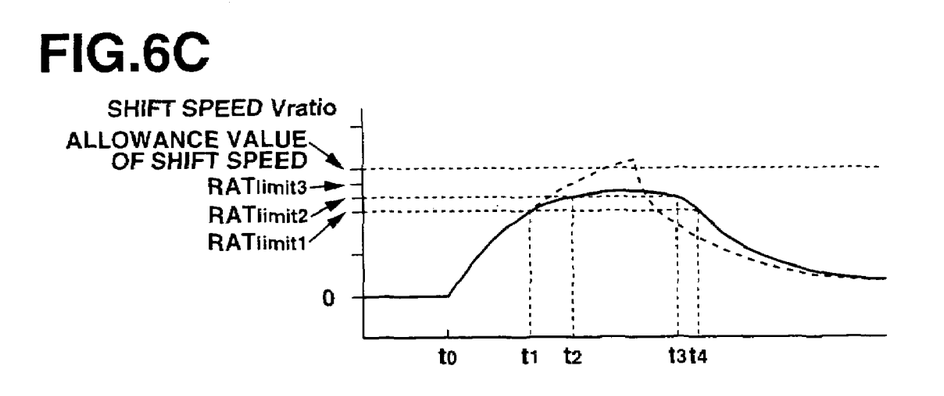
Figure 7:
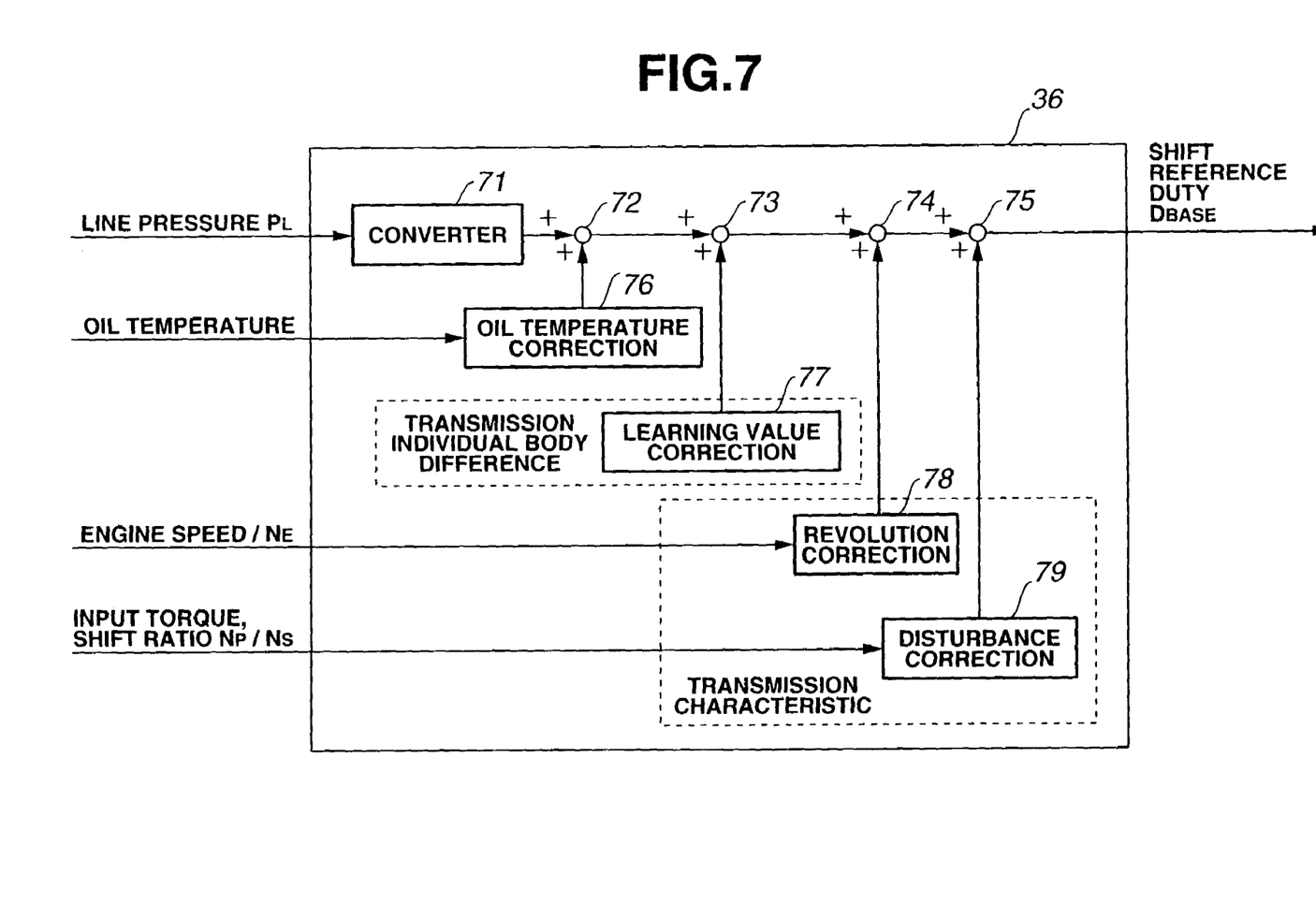
FIG. 7 is a functional block diagram of a shift reference duty calculating section of the shift control apparatus shown in FIG. 1.
Figure 8:
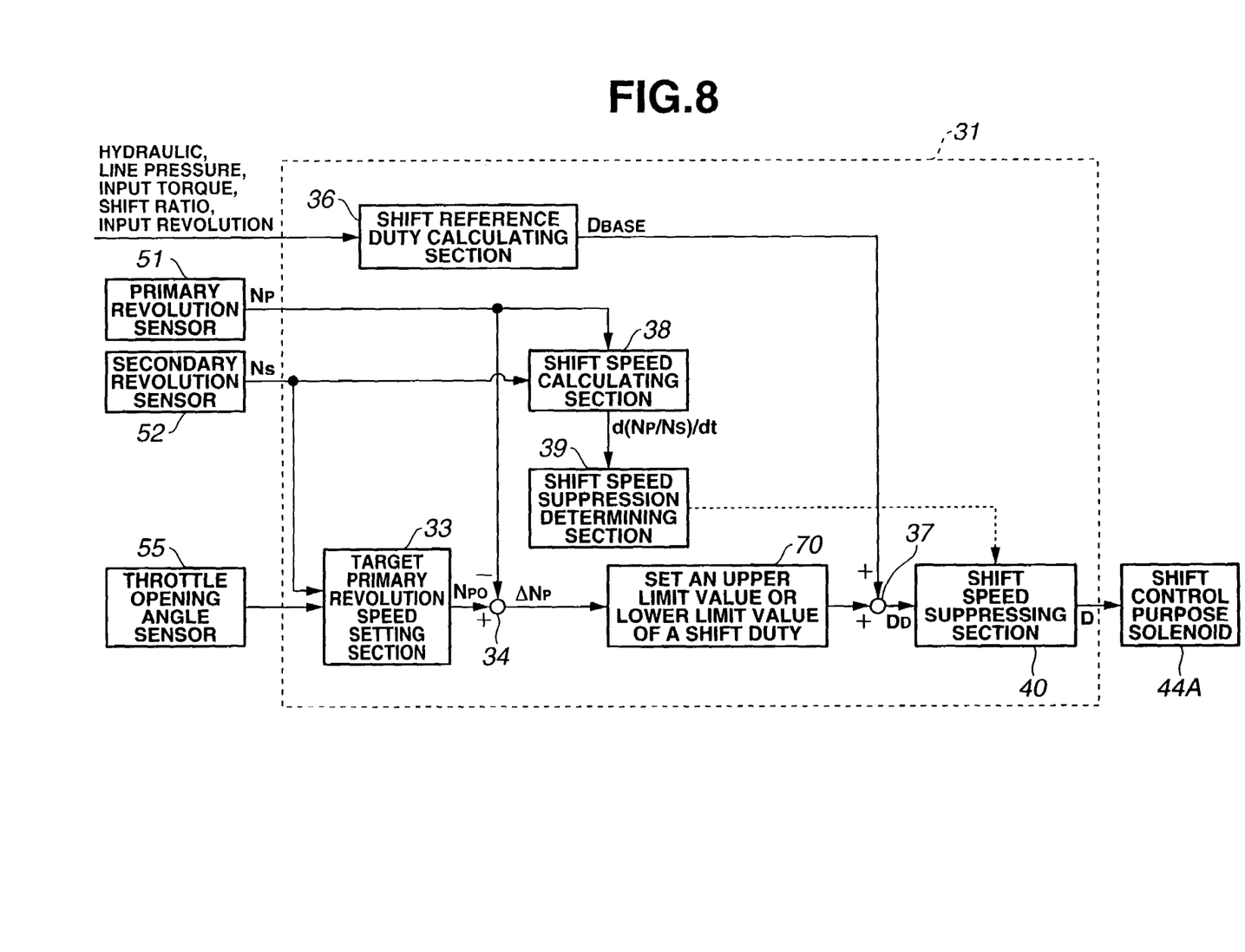
FIG. 8 is a functional block diagram of the shift control apparatus for the belt-type continuously variable transmission in a modification of the preferred embodiment.

FIGS. 1 through 8 show a shift control apparatus for a belt continuously variable transmission in a preferred embodiment according to the present invention. FIG. 1 shows a diagrammatical configuration view for explaining a power transmission system and a control system to which a shift control apparatus in a preferred embodiment is applicable. FIG. 2 shows a functional block diagram for explaining a function of a shift control in the shift control apparatus shown in FIG. 1. FIG. 3 shows a view representing a control map for the shift control in the shift control apparatus in the referred embodiment. FIGS. 4 and 5 show control flowcharts for explaining control contents of the shift control apparatus shown in FIG. 1. FIG. 6A shows a graph representing an actual shift duty D variation outputted to a shift control purpose solenoid. FIG. 6B shows a graph representing a variation in a shift ratio between a primary pulley and a secondary pulley. FIG. 6C shows a graph representing a variation in a variation speed. FIG. 7 shows a functional block diagram representing a shift reference duty calculating section in the shift control apparatus. FIG. 8 shows a functional block diagram of a modification of the shift control apparatus in the preferred embodiment.

First, a vehicular power transmission mechanism to which a shift control apparatus in a preferred embodiment is applicable will be explained with reference to FIG. 1. A vehicle to which the shift control apparatus in the preferred embodiment is applicable is a front drive vehicle. A revolution outputted from an engine 1 is transmitted to front road wheels 3, 3 with a gear shifted by means of a continuously variable transmission. Continuously variable transmission 2 includes a torque converter 4, a forward-reverse revolution switch mechanism 5, a belt type continuously variable transmission mechanism 6, a speed reduction mechanism 7, and a differential mechanism (front differential) 8. Torque converter 4 is linked to an output shaft (axle) 1a of engine 1. The revolution of engine 1 is transmitted to forward-reverse revolution switch mechanism 5 via torque converter 4 and is transmitted to belt type continuously variable transmission mechanism 6 via forward-reverse revolution switch mechanism 5. Then, belt type continuously variable transmission 6 appropriately gear shifted, the power is transmitted to differential mechanism 8 via speed reduction mechanism 7, and is distributed to left and right front road wheels 3, 3. It is noted that torque converter 4, forward-reverse revolution switch mechanism 5, speed reduction mechanism 7, and differential mechanism 8 are generally known. Hence, the detailed explanation thereof will herein be omitted.

Belt type continuously variable transmission 6 includes a primary pulley 21, a secondary pulley 22, and a belt 23. A revolution inputted from forward-reverse revolution switch mechanism 5 to a primary shaft 24 is inputted from a primary pulley coaxially integrated to primary shaft 24 to a secondary pulley via belt 23. Primary pulley 21 and secondary pulley 22 are constituted by two sheaves 21a, 21b and 22a, 22b which are integrally revolved, respectively. One of sheaves 21a, 22a is a stationary sheave fixed in the axial direction and the other sheave 21b, 22b is a movable sheave movable in an axial direction by means of a hydraulic piston 21c, 22c.

Each hydraulic piston 21c, 22c receives a controlled hydraulic obtained by applying a pressure to a working oil within an oil tank 41 by means of an oil pump 42. Specifically, hydraulic piston 22c of secondary pulley 22 receives a line pressure $P_L$ adjusted by means of a pressure regulation valve (line pressure adjusting valve) 43 and hydraulic piston 21c of primary pulley 21 receives a working oil whose flow quantity is adjusted by means of a flow quantity control valve (shift ratio adjusting valve) 44. The working oil supplied to secondary pulley 22 is acted as a hydraulic (secondary pressure) for a clamping of belt 23 and the working oil supplied to primary pulley 21 is acted as a shift ratio adjusting oil pressure (primary pressure) $P_P$. It is noted that oil pump 42 is driven by means of a revolution taken from output axle 1a of engine 1.

Next, the vehicular control system will be described. The power transmission mechanism described above is integrally controlled by means of an ECU (Electronic Control Unit) 30. In this embodiment, detecting means for detecting various kinds of information related to a driving state of the vehicle includes: a primary revolution sensor 51 detecting a revolution speed (primary revolution speed) $N_P$ of primary pulley 21; a secondary revolution sensor 52 detecting a revolution speed (secondary revolution speed) $N_S$ of secondary pulley 22; a line pressure sensor 53 detecting a line pressure $P_L$; a primary pressure sensor 54 detecting primary pressure $P_P$; and a throttle opening angle sensor 55 detecting a throttle opening angle θs of engine 1. It is noted that an engine speed (a revolution speed of the output axle of engine 1) is calculated from primary revolution speed $N_P$ detected by primary revolution sensor 51. A vehicle speed (traveling speed of the vehicle) can be calculated from secondary revolution speed $N_S$ calculated from secondary revolution sensor 52.

ECU 30 receives detection signals from various sensors 51 through 55. ECU 30 controls engine 1 and continuously variable transmission 2 on the basis of these detection signals and selection signals. Specially, for the control of continuously variable transmission 2, ECU 30 controls pressure regulation valve 43 and flow quantity control valve 44 installed in a hydraulic system to each pulley 21, 22. It is noted that pressure regulation valve 43 is controlled by controlling a line pressure control purpose solenoid 43A using a duty (ratio) of an electrical signal supplied thereto and flow quantity control valve 44 is controlled by controlling a shift ratio control purpose solenoid 44A using a duty (ratio) of an electrical signal supplied thereto.

Specifically, ECU 30 includes a shift ratio control section 31 for controlling flow quantity control valve (shift ratio control) and a line pressure controlling section 32 for controlling pressure regulator valve 43 (line pressure control). In this embodiment, shift ratio control section 31 constitutes a feedback controlling section performing a feedback control of flow quantity control valve 44 which is the hydraulic control system of primary pulley 21.

As shown in FIG. 2, (gear) shift ratio control section 31 includes: a target primary revolution setting section 33; a subtractor 34; PID control section 35; shift ratio reference duty calculating section 36; an adder 37; a shift speed calculating section 38; a shift speed suppression determining section 39; and a shift speed suppression section 40. Each functional element will be described below. Target primary revolution setting section 33 sets target revolution speed $N_{P0}$ of primary pulley 21 from a parameter corresponding to the vehicle speed (herein, revolution speed (secondary revolution speed) of secondary pulley 22 corresponding to the vehicle speed) and a load (throttle opening angle θs) of engine 1. Here, a target primary revolution speed $N_{P0}$ is determined from a control map shown in FIG. 3.

In control map M1 shown in FIG. 3, target primary revolution speed $N_{P0}$ is set to be higher as throttle opening angle θs becomes larger (wider) and becomes maximum at a time of a full load corresponding state (throttle opening angle θs is at 100%). In addition, an FL line shown in control map M1 is a shift line when the shift ratio gives a maximum (namely, a full low) and OD line is a shift line when the shift ratio gives a minimum (namely, an over drive). Target primary revolution speed $N_{P0}$ is set within a region enclosed by FL line and OD line.

When, with the accelerator pedal released, throttle opening angle θs is in a full closed state, target primary revolution speed $N_{P0}$ is set on OD line. Then, as the vehicle speed (namely, secondary revolution speed $N_S$) is reduced, target primary revolution speed $N_{P0}$ is reduced and set along OD line. However, if secondary revolution speed $N_S$ is equal to or below a predetermined value $N_{S1}$, target primary revolution speed $N_{P0}$ is maintained at a predetermined value $N_{P1}$ outside from OD line.

Subtractor 34 calculates a deviation $\Delta N_P$ (=$N_{P0}$-$N_P$) between actual revolution speed (actual primary revolution speed) of primary pulley 21 detected by means of primary revolution sensor 51 and target primary revolution speed $N_{P0}$. The calculated deviation $\Delta N_P$ is outputted to PID control section 35. PID control section 35 carries out a correction for deviation $\Delta N_P$ (=$N_{P0}$-$N_P$) calculated by subtractor 34 by means of a PID (Proportional-Integration-Differentiation) control. Specifically, PID control section 35 includes: a proportional correction quantity calculating section 60 for calculating a feedback correction quantity by means of a proportional control (P control); an integration correction quantity calculating section 61 for calculating a feedback correction quantity by means of an integration control (I control); a differential correction quantity calculating section 62 for calculating a feedback correction quantity by means of a differential control (D control); and an adder 63 at which each feedback correction quantity is added together.

Proportional correction quantity calculating section 60 calculates a proportional correction quantity $D_{FP}$ (=$K_P \times \Delta N_P$) (feedback correction quantity by means of the proportional control) by multiplying deviation $\Delta N_P$ with a predetermined proportional control gain $K_P$. Integration correction quantity calculating section 61 calculates integration correction quantity $D_{FI}$ [=∫($K_I \times \Delta N_P$)dt] (feedback correction quantity by means of the integration control) by integrating deviation $\Delta N_P$ multiplied by a predetermined integration control gain $K_I$. In addition, differential correction quantity calculating section 62 calculates differential correction quantity $D_{FD}$ [=d($K_D \times \Delta N_P$)/dt] (feedback correction quantity by means of differential control) by differentiating deviation $\Delta N_P$ multiplied with a predetermined differential control gain $K_D$. It is noted that each gain $K_P$, $K_I$, and $K_D$ is set with primary revolution speed $N_P$, secondary revolution speed $N_S$, and oil temperature as parameters. Each correction quantity $D_{FP}$, $D_{FI}$, and $D_{FD}$ calculated by each correction quantity calculating section 60, 61, 62 is added at adder 63 and outputted to an adder 37 as feedback correction quantity $D_F$ (=$D_{FP}$+$D_{FI}$+$D_{FD}$).

Adder 37, in addition to feedback correction quantity $D_F$, receives a shift reference duty $D_{BASE}$ from a shift reference duty calculating section 36. Shift reference duty $D_{BASE}$ is a duty to supply a required oil pressure (primary pressure) to maintain the present shift ratio. Shift reference duty calculating section 36 converts line pressure $P_L$ detected by line pressure sensor 53 into a duty using a previously stored map and calculates shift reference duty $D_{BASE}$ by carrying out the correction according to the oil pressure, the shift ratio ($N_P/N_S$), an input torque, and an engine speed $N_E$. This adder 37 adds feedback correction quantity $D_F$ to this shift reference duty $D_{BASE}$ and outputs the added result as a shift duty $DD_I$ (=$D_{BASE}$+$D_F$) to shift speed suppressing section 40.

Shift reference duty calculating section 36, as shown in FIG. 7, includes a converter 71 which converts line pressure $P_L$ detected by line pressure sensor 53 into the duty and oil pressure correcting section 76, a learning value correcting section 77, a revolution correcting section 78, and an external disturbance correcting section 79. These correcting sections 76, 77, 78, and 79 inputs respectively the oil temperature, primary pressure $P_P$, engine speed $N_E$, an input torque, and shift ratio $N_P/N_S$. The correction value of the duty corresponding to these parameters is calculated. Specifically, a map corresponding to the correction value of the duty for each parameter is prepared on the basis of experiments. Each correction value is added to adders 72, 73, 74, and 75 for the duty outputted from converter 71.

It is noted that a learning value correcting section (a learning value correction) 77 stores a difference between shift reference duty $D_{BASE}$ (namely, a duty controlled variable as a target value of the primary pulley) calculated by shift reference duty calculating section 36 itself and the duty corresponding to the actual primary pressure at which the shift ratio of the vehicle is maintained in a full low state (maximum shift ratio) in a vehicular stopped state (under a state at which a shift lever is operated in a D range) as a learning value. The correction according to the learning value is carried out. (It is noted that, for the correction according to the learning value, a corresponding map between the learning value and the correction value may be carried out).

In addition, in an initial state (a state in which the transmission has at first been used and it does not take a long time since the transmission has at first been used), shift reference duty $D_{BASE}$ calculated by shift reference duty calculating section 36 is set to have a low duty tendency. Learning value correcting section 77 additively corrects shift reference duty $D_{BASE}$ by the learning. In details, as compared with the duty corresponding to the actual primary pressure, shift reference duty $D_{BASE}$ is calculated as a slightly small value and its difference is stored as the learning value. According to this storage, variations in the calculation result of shift reference duty $D_{BASE}$ generated according to the individual body difference of the transmission can be absorbed.

A Shift speed suppressing section (shift speed suppressing means) 40 calculates actual shift duty D by multiplying shift duty $D_D$ inputted from adder 37 with a predetermined coefficient and outputs actual shift duty D to shift control purpose solenoid 44A. It is noted that shift speed suppression section 40 can set a predetermined coefficient to calculate actual shift duty D according to a shift speed (specifically, according to a shift duty suppression signal) as will be described later. It is noted that the predetermined coefficient represents a percentage between shift duty $D_D$ calculated by shift ratio controlling section 31 and actual shift duty D actually used in control over actual shift control purpose solenoid 44A. A shift duty $D_D$ is reduced to calculate actual shift duty D by multiplying shift duty $D_D$ with a predetermined coefficient. In details, a magnitude of the duty to actually control shift control purpose solenoid 44A can integrally be reduced at a time immediately before the duty is outputted to shift control purpose solenoid 44A.

Shift control purpose solenoid 44A drives flow quantity control valve 44 in accordance with shift duty D inputted from shift speed suppressing section 40. Consequently, the primary pressure is adjusted for actual primary revolution speed $N_P$ of primary pulley 21 to approach to target primary revolution speed $N_{PO}$.

Next, a shift speed calculating section (shift speed detecting section) 38 and a shift speed suppression determining section 39 will be described below. These functional section functions as preventing the belt slip by suppressing the shift speed in a case where the shift speed, namely, a variation speed of the shift ratio is too fast. Because of this, shift speed calculating section 38 calculates the shift speed from primary revolution speed sensor 51 and secondary revolution speed N5 detected by secondary revolution sensor 52. That is to say, primary revolution sensor 51, secondary revolution sensor 52, and shift speed calculating section 38 constitutes shift speed detecting section (means) for detecting the shift speed. The use of the slip speed for the determination criterion of preventing the belt slip is due to the following reason. That is to say, the belt slip has a relation with a movement speed of belt 23 in a radial direction. If this movement speed is in excess of a predetermined speed, the belt slip will occur. The movement speed of belt 23 exactly corresponds to the shift speed by 1:1. Hence, if shift speed is used as the determination criterion, the belt slip can accurately be determined. On the other hand, for example, if an engine acceleration is used as the determination criterion, the engine acceleration does not directly correspond to the movement speed in the radial direction. Hence, even in the same acceleration, the radial directional movement speed of belt 23 is varied depending upon the vehicle speed. Hence, it is inappropriate for the engine acceleration to be the determination criterion of preventing the belt slip.

Specifically, shift speed calculating section 38 calculates a ratio between primary revolution speed $N_P$ and secondary revolution speed $N_S$ for each of calculation periods, namely, shift ratio (or called, speed ratio) Ratio (=$N_P/N_S$). Then, shift speed calculating section 38 calculates a deviation ΔRatio (=Ratio−Ratioold) from shift ratio Ratioold calculated at the previous calculation period and divides this deviation by calculation period Δt to derive shift speed $V_{ratio}$ (=ΔRatio/Δt).

Shift speed suppression determining section 39 sets a variation of a suppression quantity to suppress an advance of the shift ratio control in accordance with shift speed $V_{ratio}$ calculated by shift speed calculating section. Thus, shift speed $V_{ratio}$ is suppressed. In this embodiment, shift speed suppression determining section 39 determines whether a magnitude of shift speed $V_{ratio}$ calculated by shift speed calculating section 38 is equal to or larger than a plurality of predetermined threshold values in a stepwise manner. On the basis of a determination result thereof, a suppression control of the shift speed at PID control section 35 and shift speed suppression section 40 is executed.

First, shift speed suppression determining section 39 determines whether shift speed $V_{ratio}$ is equal to or larger than a first threshold value (a predetermined value) $RAT_{limit1}$. This first threshold value $RAT_{limit1}$ is set to a value sufficiently smaller than a limit shift speed (an allowance value of the shift speed) at which the belt slips. On the other hand, in the previously proposed shift control apparatus disclosed in the Japanese Patent Application First Publication No. 2001-304389, threshold value Vo is derived from experiments and is set, threshold value Vo being placed in the vicinity to an upper limit shift speed at which the belt does not slip. However, in this embodiment, a plurality of threshold values are set. First threshold value $RAT_{limit}$ is set to be smaller than this threshold value Vo.

If the magnitude of shift speed $V_{ratio}$ is smaller than first threshold value $RAT_{limit1}$, no signal is outputted to PID control section 35 and shift speed suppression section 40. However, if the magnitude of shift speed $V_{ratio}$ is determined to be equal to or larger than first threshold value $RAT_{limit1}$, shift speed suppression determining section 39 outputs a first shift duty suppression signal to PID control section 35 and shift speed suppression section 40. In details, if the (the magnitude of) shift speed is smaller than first threshold value $RAT_{limit1}$, an ordinary shift control is executed since there is no possibility of the belt slip. If shift speed is equal to or larger than the first threshold value, shift speed suppression control is executed.

Furthermore, shift speed suppression determining section 39 determines whether the magnitude of shift speed $V_{ratio}$ is equal to or larger than a second threshold value $RAT_{limit2}$ which is larger than first threshold value $RAT_{limit1}$ but is smaller than the allowance value of the shift speed. If shift speed $V_{ratio}$ is determined to be smaller than second threshold value $RAT_{limit2}$, the comparison and determination between shift speed $V_{ratio}$ and first threshold value $RAT_{limit1}$, are repeated since shift speed $V_{ratio}$ at that time falls within a range from first threshold value $RAT_{limit1}$ to second threshold value $RAT_{limit2}$. On the other hand, if the magnitude of shift speed $V_{ratio}$ is determined to be equal to or larger than second threshold value $RAT_{limit2}$, shift speed suppression determining section 39 outputs a second shift duty suppression signal. Furthermore, shift speed suppression determining section 39 determines whether shift speed $V_{ratio}$ is equal to or larger than a third threshold value $RAT_{limit3}$ which is set to be larger than second threshold value but is smaller than the allowance value of the shift speed. In this case, if shift speed $V_{ratio}$ is smaller than third threshold value $RAT_{limit3}$, the comparison and determination between shift speed $V_{ratio}$ and second threshold value $RAT_{limit2}$ are repeated. If shift speed $V_{ratio}$ is equal to or larger than third threshold value $RAT_{limit3}$, shift speed suppression determining section 39 outputs a third shift duty suppression signal to PID control section 35 and shift speed suppression section 40.

In this way, shift speed suppression determining section 39 determines the magnitude of shift speed $V_{ratio}$ in the stepwise manner and outputs the shift duty signal in accordance with one corresponding step. The details of the suppression control of shift speed $V_{ratio}$ by means of the shift duty suppression signal will be described later. It is noted that, in this embodiment, using three threshold values of first threshold value $RAT_{limit1}$, second threshold value $RAT_{limit2}$, and third threshold value $RAT_{limit3}$, the magnitude of shift speed $V_{ratio}$ is determined in the stepwise manner and three kinds of shift duty suppression signals are outputted. However, the number of the steps to determine the magnitude of shift speed $V_{ratio}$ are arbitrary. For example, the magnitude of the shift speed may continuously be determined and the suppression control in accordance with the determination value may be executed.

When one of the above-described shift duty suppression signals is inputted to PID control section 35 and shift speed suppression section 40, the suppression control in accordance with the inputted shift duty suppression signal is executed. First, PID control section 35 adds each correction quantity calculated by each control section of proportional correction quantity calculating section 60, integration correction quantity calculating section 61, and differential correction quantity calculating section 62 to calculate a feedback correction quantity $D_F$ as described above in a case where no shift duty suppression signal is inputted. However, in a case where the first shift duty suppression signal is inputted, PID control section 35 sets feedback correction quantity $D_F$ to be reduced. At this time, in this embodiment, a value of the addition (hereinafter, referred to as a feedback addition value) of each correction quantity calculated by proportional correction quantity calculating section 60, integration correction quantity calculating section 61, and differential correction quantity calculating section 62 multiplied with a first correction gain $J_1$ ($0<J_1<1$) is outputted as feedback correction quantity $D_F$. In addition, in a case where the second shift duty suppression signal is inputted, the value of the feedback addition value multiplied with a second correction gain $J_2$ ($J_2<J_1$, $0<J_2<1$) is outputted as feedback correction quantity $D_F$. In a case where the third shift duty suppression signal is inputted, the value of the feedback addition value multiplied with a third correction gain $J_3$ set to be furthermore smaller than second correction gain $J_2$ is outputted as feedback correction value $D_F$. In this way, in PID control section 35, feedback correction quantity $D_F$ calculated in accordance with shift speed is set to be reduced.

In shift speed suppression section 40, such an ordinary suppression control that actual shift duty D is calculated by multiplying shift duty $D_D$ with predetermined ordinary coefficient $K_0$ ($D=K_0 \times D_D$) is executed in a case where no shift duty suppression signal is inputted. However, when first shift duty suppression signal is inputted, actual shift duty D is calculated by multiplying first coefficient $K_1$ with shift duty $D_D$ ($D=K_1 \times D_D$). In addition, when second shift duty suppression signal is inputted, a second coefficient $K_2$ set as a value smaller than first coefficient $K_1$ is multiplied with shift duty $D_D$ to calculate actual shift duty D ($D=K_2 \times D_D$). Furthermore, when third shift duty suppression signal is inputted, a third coefficient $K_3$ set to be smaller than second coefficient $K_2$ is multiplied with shift duty $D_D$ to calculate actual shift duty D ($D=K_3 \times D_D$).

In this way, in shift speed suppression section 40, in the same way as PID control section 35, the suppression quantity to suppress the advance of the shift ratio control in accordance with the shift speed is set. That is to say, if the magnitude of shift speed $V_{ratio}$ is equal to or larger than first threshold value $RAT_{limit1}$, the coefficient multiplied with shift duty $D_D$ becomes small and actual shift duty D is reduced (namely, $K_3<K_2<K_1<K_0$).

It is noted that, in this embodiment, each of first coefficient $K_1$, second coefficient $K_2$, and third coefficient $K_3$ is set as a fixed value. It is preferable that each coefficient may preferably be set in accordance with a characteristic of flow quantity control valve 44. In addition, for example, each coefficient may be set as a function with shift ratio Ratio and primary revolution speed $N_P$ as parameters. Since the shift control apparatus for the belt-type continuously variable transmission in the preferred embodiment is constructed as described above, the belt-type continuously variable transmission shift control is carried out as shown in flowcharts of FIGS. 4 and 5.

In the flowchart shown in FIG. 4, shift ratio controlling section 31, at a step A10, determines target primary revolution speed $N_{P0}$ from a control map on the basis of secondary revolution speed $N_S$ and throttle opening angle θs. At the next step A20, shift ratio controlling section 31 reads actual primary revolution speed $N_P$ detected by means of a primary revolution sensor 51 and calculates a feedback correction quantity D ($=D_{FP}=D_{FI}=D_{FD}$) by means of proportional, integration, and differential control on the basis of deviation $\Delta N_P$ ($=N_{P0}-N_P$) between target primary revolution speed $N_{P0}$ and actual primary revolution speed $N_P$.

Next, at a step A40, shift ratio controlling section 31 calculates shift ratio Ratio ($=N_P/N_S$) on the basis of primary revolution speed $N_P$ and secondary revolution speed $N_S$ and, at a step A50, calculates shift speed $V_{ratio}$ ($=\Delta Ratio/\Delta t$) on the basis of deviation $\Delta Ratio$ ($=Ratio-Ratioold$) between presently calculated shift ratio Ratio and previously calculated shift ratio Ratioold. Then, at a step A60, shift ratio duty suppression signal is read. At step S60, shift ratio controlling section 31 reads the duty suppression signal. Then, at a step S70, the suppression control of the shift speed in accordance with the shift duty suppression signal is executed.

In the flow process, shift duty signal read at step A60 is outputted from shift speed suppression determining section 39 by the flowchart shown in FIG. 5. That is to say, shift ratio controlling section 31 repeatedly controls the flow of FIGS. 4 and 5 in parallel to each other. The calculated data and determination result in the mutual flow process are communicated with each other.

In the flowchart shown in FIG. 5, shift speed suppression determining section 39, at a step B10, determines whether shift speed $V_{ratio}$ calculated at step A50 is equal to or larger than first threshold value $RAT_{limit1}$. If $V_{ratio} \geq RAT_{limit1}$, the routine goes to a step B20. At step B20, shift speed suppression determining section 39 outputs first duty suppression signal to PID control section 35 and shift speed suppression section 40 and the routine goes to a step B30. If $V_{ratio} < RAT_{limit1}$ (No) at step B10, no shift duty suppression signal is outputted and this flow is ended. At step B30, shift speed suppression determining section 39 determines whether the magnitude of shift speed $V_{ratio}$ is equal to or larger than second threshold value $RAT_{limit2}$. If $V_{ratio} \geq RAT_{limit2}$, the routine goes to a step B40. At step B40, shift speed suppression determining section 39 outputs second shift duty suppression signal to PID control section 35 and shift speed suppression section 40. Then, the routine goes to a step B50. If $V_{ratio} < RAT_{limit2}$ at this step B30, the routine returns to step B10.

Suppose that, if the determination condition at step B30 is not established, this flow is ended. If this flow is carried out, shift speed suppression determining section 39 receives the first shift duty suppression signal. Hence, the suppression control of shift speed at each of steps A60 and A70 is carried out. In this case, the period at which the shift duty signal is updated is dependent upon the execution period of this flow. At least, the period becomes longer than the execution period of this flow.

Therefore, in this embodiment, if the determination period at step B30 is not established, the routine returns to step B10. At step B10, the comparison between shift speed $V_{ratio}$ and first threshold value $RAT_{limit1}$ is again made so that a high response performance can be achieved. In details, the period of the comparison between shift speed $V_{ratio}$ and threshold value is shortened as short as possible and the shift duty suppression signal can be outputted with a fast responsive characteristic to the variation in shift speed $V_{ratio}$.

Next, at step B50, shift speed suppression determining section 39 determines whether the magnitude of shift speed $V_{ratio}$ is equal to or larger than third threshold value $RAT_{limit3}$. If $V_{ratio} \geq RAT_{limit3}$, the routine goes to step B60. At step B60, shift speed suppression determining section 39 outputs third shift duty suppression signal to PID control section 35 and shift speed suppression section 40. Then, the routine returns to step B50 at which the comparison between shift speed $V_{ratio}$ and third threshold value $RAT_{limit3}$ is repeatedly made. If, at step B50, $V_{ratio} < RAT_{limit2}$, the routine returns to step B30.

The flow shown in FIG. 5 is executed at a substantially constant period if shift speed $V_{ratio}$ is smaller than first threshold value $RAT_{limit1}$ (In this case, the shift duty suppression signal is not outputted). Once the magnitude of shift speed $V_{ratio}$ is equal to or larger than first threshold value $RAT_{limit1}$, shift duty suppression signal is outputted and the routine is not ended unless shift speed $V_{ratio}$ is smaller than first threshold value $RAT_{limit1}$.

As described above, the flow shown in FIG. 5 causes any one of first, second, and third shift duty suppression signals to be outputted from shift speed control determining section 39. When this signal is read at step A60 shown in FIG. 4, the control corresponding to the read shift duty suppression signal is executed at PID control section 35 and shift speed suppression section 40. First, PID control section 35, when first shift duty suppression signal is inputted, outputs the feedback addition value multiplied with first correction gain $J_1$ to adder 37 as feedback correction quantity $D_F$. When second shift duty signal is inputted, PID control section 35 outputs the feedback addition value multiplied with second correction gain $J_2$ to adder 37 as feedback correction quantity $D_F$. On the other hand, shift speed suppression section 40 multiplies shift duty $D_D$ outputted from adder 37 with first coefficient $K_1$ to calculate actual shift duty D and outputs actual shift duty D to shift control purpose solenoid 44A to control flow quantity control valve 44, when first shift duty suppression signal is inputted. In addition, when second shift duty suppression signal is inputted, shift duty suppression section 40 multiplies shift duty $D_D$ outputted from adder 37 with second coefficient $K_2$ to calculate actual shift duty D and outputs actual shift duty D to shift control purpose solenoid 44A to control flow quantity control valve 44. In the same way, when third shift duty suppression signal is inputted, shift speed suppression section 40 multiplies shift duty $D_D$ outputted from adder 37 with third coefficient $K_3$ to calculate actual shift duty D and outputs actual shift duty D to shift control purpose solenoid 44A to control flow quantity control valve 44.

In this way, in this embodiment, PID control section 35 calculates feedback correction quantity $D_F$ ($=D_{FP}+D_{FI}+D_{FD}$) multiplied with first correction gain $J_1$ in a case where the magnitude of shift speed $V_{ratio}$ is equal to or larger than predetermined first threshold value $RAT_{limit1}$.

Therefore, feedback correction quantity $D_F$ outputted to adder 37 is reduced as compared with a case where shift speed $V_{ratio}$ is smaller than predetermined first threshold value $RAT_{limit1}$. Furthermore, in a case where shift speed $V_{ratio}$ is large, feedback correction quantity $D_F$ is furthermore reduced in accordance with the magnitude degree of shift speed $V_{ratio}$. Hence, the rise in primary pressure $P_P$ supplied to primary pulley 21 is suppressed. Thus, the variation speed of shift ratio Ratio ($=N_P/N_S$), namely, shift speed $V_{ratio}$ is suppressed.

For example, in a case where the accelerator pedal is abruptly depressed during the inertia driving in the accelerator released state or in a case of mechanical response delays of the pulleys, the shift speed can effectively be suppressed. While securing the shift performance of the automatic transmission, the belt slip due to the abrupt change in the shift ratio can effectively be prevented. In addition, the degree of the magnitude of shift speed $V_{ratio}$ is determined in the stepwise manner by means of three threshold values of first threshold value $RAT_{limit1}$, second threshold value $RAT_{limit2}$, and third threshold value $RAT_{limit3}$ (namely, the degree of abrupt change in the shift ratio). As shift speed $V_{ratio}$ becomes large, feedback correction quantity $D_F$ becomes decreased (namely, the suppression quantity becomes large). Thus, with a simple structure, the shift ratio control can easily be carried out. Then, shift speed $V_{ratio}$ can positively be suppressed.

At the same time as the suppression control of shift speed $V_{ratio}$ in PID control section 35, in a case where shift speed $V_{ratio}$ is equal to or larger than first threshold value $RAT_{limit1}$, shift speed suppression section 40 multiplies shift duty $D_D$ outputted from adder with first coefficient $K_1$ to calculate actual shift duty D. Hence, actual shift duty D outputted to shift control purpose solenoid 44A is furthermore reduced. Thus, the rise in primary pressure $P_P$ supplied to primary pulley 21 is suppressed. Thus, the variation speed of shift ratio Ratio ($=N_P/N_S$), namely, shift speed ratio $V_{ratio}$ is furthermore suppressed.

In addition, the degree of the magnitude of shift speed $V_{ratio}$ is determined in the stepwise manner by means of three threshold values of first threshold value $RAT_{limit1}$, second threshold value $RAT_{limit2}$, and third threshold value $RAT_{limit3}$. As shift speed $V_{ratio}$ becomes larger, the coefficient multiplied with shift duty $D_D$ becomes smaller (namely, the suppression quantity becomes larger). Hence, with the simple structure, the shift ratio control can easily be carried out and shift speed $V_{ratio}$ can positively be suppressed.

In addition, since the degree of the magnitude of shift speed $V_{ratio}$ is determined in the stepwise manner, the stepwise suppression in accordance with the magnitude of the shift speed (in details, the degree of the abrupt change in the shift ratio) becomes possible. The shift speed is not in excess of the limit shift speed (allowance value of the shift speed) and the allowance limit of the shift speed can be guaranteed. That is to say, as denoted by a solid line of FIG. 6C, when the vehicle driver depresses the accelerator pedal at a time point $t_0$, shift speed $V_{ratio}$ starts to be increased. As shown in FIG. 6A, as the ordinary suppression control, a predetermined ordinary coefficient $K_0$ is multiplied with shift duty $D_D$ to calculate actual shift duty D. Thereafter, the shift speed $V_{ratio}$ is furthermore increased. When shift speed becomes equal to or larger than first threshold value $RAT_{limit1}$, first coefficient $K_1$ which is smaller than predetermined ordinary coefficient $K_0$ is multiplied with shift duty $D_D$ and the shift speed is controlled by suppressed duty D (as denoted by the solid line of FIG. 6A). When shift speed $V_{ratio}$ becomes equal to or larger than second threshold value $RAT_{limit2}$ at a time point $t_2$, second coefficient $K_2$ which is smaller than predetermined first coefficient $K_1$ is multiplied with shift duty $D_D$. The shift speed is controlled by the further suppressed actual shift duty D. When shift speed $V_{ratio}$ is smaller than second threshold value $RAT_{limit2}$ at a time point $t_3$, the shift speed is controlled by actual shift duty D which is the multiplication of shift duty $D_D$ with first coefficient $K_1$. When shift speed $V_{ratio}$ is smaller than first threshold value $RAT_{limit1}$ at a time point $t_4$, predetermined ordinary coefficient $K_0$ is multiplied with shift duty $D_D$ as an ordinary control.

Suppose that, during a time interval between time points $t_2$ and $t_3$ (namely, under the control by means of second shift duty suppression signal), shift speed $V_{ratio}$ becomes equal to or larger than third threshold value $RAT_{limit3}$ (namely, in the controlled state by means of third shift duty suppression signal). In this case, the suppression quantity set according to second threshold value $RAT_{limit2}$ is not sufficient. However, in this embodiment, since, by the further larger suppression quantity set by third threshold value $RAT_{limit3}$, the control of shift speed is carried out, the suppression control according to second threshold value $RAT_{limit2}$ is guaranteed by the suppression control according to third threshold value $RAT_{limit3}$.

In the example shown in FIGS. 6A through 6C, since, in the controlled state by means of first shift duty suppression signal, shift speed $V_{ratio}$ becomes furthermore equal to or larger than second threshold value $RAT_{limit2}$ (namely, in the controlled state by means of the second shift duty suppression signal) at time point $t_2$, the suppression quantity set by first threshold value $RAT_{limit1}$ is not sufficient and, at that time point, the further larger suppression quantity set by second threshold value $RAT_{limit2}$. In other words, the suppression control according to first threshold value $RAT_{limit1}$ is guaranteed by the suppression control according to second threshold value $RAT_{limit2}$.

As described above, the degree of the magnitude of shift speed $V_{ratio}$ is determined in the stepwise manner so that the suppression control of the shift speed for each step can be guaranteed (it is noted that, in the case of the control as described in the Japanese Patent Application First Publication No. 2001-304389, even if first threshold value $RAT_{limit1}$ is, for example, set as threshold value Vo of shift speed $V_{ratio}$, no guarantee of the suppression control is present. Hence, as denoted by a bold dot line in FIG. 6C, in a case where the shift speed is in excess of the allowance value, the belt slip cannot be prevented from occurring.

On the other hand, in a case where shift speed $V_{ratio}$ is not equal to or larger than second threshold value $RAT_{limit2}$ after the suppression control according to first threshold value $RAT_{limit1}$ from time point $t_1$, the suppression quantity set by means of first threshold value $RAT_{limit1}$ is sufficient. In details, rather than the case where a large suppression quantity is previously set (preset) supposing that the suppression quantity set according to first threshold value $RAT_{limit1}$ is not sufficient, a further smaller suppression quantity can execute the control in addition to the securing of the sufficient suppression quantity. While preventing the belt slip due to the increase in the shift speed effectively, the shift performance can be secured. As a result, while preventing the belt slip effectively, as denoted by a solid line of FIG. 6B, the shift performance of the same degree as the case of the control (as denoted by a dot line in FIG. 6B) disclosed in the Japanese Patent Application First Publication No. 2001-304389 can be obtained.

In addition, in this embodiment, shift reference duty $D_{BASE}$ calculated by shift reference duty calculating section 36 is set to have a low duty tendency and the difference between the shift duty and actual duty corresponding to the primary pressure is learned and corrected. Therefore, for example, even if the accelerator pedal is abruptly depressed during the inertia driving in the accelerator pedal released state, the target revolution speed is set to be a high value corresponding to throttle opening angle, and the deviation between the actual revolution speed and the target revolution speed becomes abruptly large, the shift speed can effectively be suppressed, the belt slip due to the abrupt change in the shift ratio can effectively be prevented while securing the shift performance of the continuously variable transmission. As described above, the suppression of the shift speed in the initial state of the transmission is effective.

As described hereinabove, the shift control apparatus for the continuously variable transmission in the preferred embodiment has been described. The present invention is not limited to this. Various changes and modification may be made without departing from the scope and sprit of the present invention. For example, in the above-described embodiment, the present invention is applied to the shift control apparatus for the (belt-type) continuously variable transmission having shift ratio controlling section 31 at which the PID control is executed. As shown in FIG. 8 (wherein the same reference numerals are added to the same functional elements), the present invention is applicable to an alternative of the shift control apparatus in which shift ratio controlling section does not execute the PID control.

In details, in the ordinary control, as described in the above-described embodiment, target revolution speed of the primary pulley is set on the basis of the vehicular velocity and the throttle opening angle and the primary pulley pressure is feedback controlled so that actual revolution speed of the primary pulley becomes coincident with this target revolution speed. As an operation mode of the continuously variable transmission, a, so-called, sport mode is equipped. In this case, since a quick shift response is demanded at the times of an up-shift and a down-shift, upper or lower limit setting section 70 to set a controlled variable of the actual primary pressure to a mechanical upper limit or lower limit (refer to FIG. 8). A sum of the upper limit value or the lower limit value of the shift duty set by upper or lower limit setting section 70 and shift reference duty $D_{BASE}$ calculated by shift reference duty calculating section 36 is outputted to shift control purpose solenoid 44A.

In this case, PID control does not directly participate in the controlled variable of the primary pressure. Therefore, the shift speed cannot be suppressed by decreasing the feedback correction quantity. However, according to this alternative, actual shift duty D can be reduced by multiplying shift duty $D_D$ outputted from adder 37 with the coefficient set in accordance with the magnitude of the shift speed. The rise in primary pressure $P_P$ supplied to primary pulley 21 is suppressed so that variation speed of Ratio ($=N_P/N_S$) namely, shift speed $V_{ratio}$ can be suppressed.

In addition, the coefficients to be multiplied with shift duty $D_D$ are set with the degree of the magnitude of shift speed $V_{ratio}$ determined in the stepwise manner. The stepwise suppression according to the magnitude of the shift speed becomes possible. The shift speed is not in excess of the limit shift speed (the allowance value of the shift speed) and the allowance limit of the shift speed can be guaranteed. In addition, the coefficients to be multiplied with shift duty $D_D$ are set with the degree of the magnitude of shift speed $V_{ratio}$ determined in the stepwise manner. The stepwise suppression according to the magnitude of the shift speed becomes possible. The shift speed is not in excess of the limit shift speed (the allowance value of the shift speed) and the allowance limit of the shift speed can be guaranteed. In addition, in the above-described embodiment, the degree of the magnitude of shift speed $V_{ratio}$ is determined in the stepwise manner by means of three threshold values of first threshold value $RAT_{limit1}$, second threshold value $RAT_{limit2}$, and third threshold value $RAT_{limit3}$ and three kinds of the shift duty suppression signals are outputted. However, the number of steps to determine the degree of the magnitude of shift speed are arbitrary. That is to say, if the number of steps to determine the degree of the magnitude of shift speed $V_{ratio}$ are increased, a range of shift speed $V_{ratio}$ for which the guaranteed suppression control can be carried out can be widened. Together with the increase in the number of steps to determine the degree of the magnitude of shift speed $V_{ratio}$, a width of the degree of the magnitude of shift speed $V_{ratio}$ is finely set so that the degree of the magnitude of shift speed $V_{ratio}$ may be determined in the continuous manner. In this case, the same advantages as in the case of the second embodiment can be obtained.

The degree of the magnitude of shift speed $V_{ratio}$ corresponding to the suppression control is set as a function. For the variation of the degree of the magnitude, the suppression quantity may continuously be set. In this structure, the correspondence relationship between the shift speed and the suppression quantity to suppress the advance of the shift ratio control becomes clear. An accurate control can be achieved. In addition, in the above-described embodiment, learning value correcting section 77 (a learning value correction in FIG. 7) which learns and corrects a difference between shift reference duty $D_{BASE}$ and the duty corresponding to actual primary pressure is provided so that shift reference duty $D_{BASE}$ calculated by shift reference duty calculated by shift reference duty calculating section 36 is set to have the low duty tendency. However, these situations are not essential.

It is noted that, in the above-described embodiment, the front wheel drive type vehicle is described. However, a drive type of the vehicle is arbitrary. For example, the present invention is applicable to a four-wheel drive vehicle or rear wheel drive vehicle.

The entire contents of a Japanese Patent Application No. 2004-091307 (filed in Japan on Mar. 26, 2004) are herein incorporated by reference. The scope of the invention is defined with reference to the following claims.

What is claimed is:

1. A shift control apparatus for a continuously variable transmission, comprising:
   a primary pulley;
   a secondary pulley;
   an endless belt wound on both of the primary and the secondary pulleys;
   a shift ratio controlling section that controls a shift ratio between the primary pulley and the secondary pulley;
   a shift speed detecting section that detects a shift speed, the shift speed being a variation quantity of the shift ratio per unit of time: and
   a shift speed suppression section that suppresses an advance of a shift ratio control by the shift ratio controlling section to suppress the shift speed when a magnitude of the shift speed is equal to or larger than a predetermined value, the shift speed suppression section setting a suppression quantity to suppress the advance of the shift ratio control so as to suppress the shift speed,
   wherein the shift ratio controlling section includes a feedback controlling section that performs a feedback control for a hydraulic control system of the primary pulley on a basis of a deviation between a target value in accordance with a driving state and a revolution speed corresponding value of the primary pulley in such a manner that the revolution speed corresponding value of the primary pulley is made coincident with the target value and wherein the shift speed suppression section sets the suppression quantity in such a manner that a feedback correction quantity used in the feedback controlling section is reduced in accordance with the shift speed.

2. A shift control apparatus for a continuously variable transmission as claimed in claim 1, wherein the shift speed suppression section sets the suppression quantity as a function of the shift speed in a range in which the magnitude of the shift speed is equal to or larger than the predetermined value.

3. A shift control apparatus for a continuously variable transmission as claimed in claim 1, wherein the shift speed suppression section sets the suppression quantity in a stepwise manner in a range in which the magnitude of the shift speed is equal to or larger than the predetermined value.

4. A shift control apparatus for a continuously variable transmission as claimed in claim 1, wherein the suppression quantity is set to be larger as the shift speed becomes larger in a range in which the magnitude of the shift speed is equal to or larger than the predetermined value.

5. A shift control apparatus for a continuously variable transmission as claimed in claim 1, wherein the shift speed detecting section comprises: a primary revolution sensor to detect a primary revolution speed of the primary pulley; a secondary revolution sensor to detect a secondary revolution speed of the secondary pulley; and a shift speed calculating section that calculates the shift speed $V_{ratio}$ from the primary and secondary revolution speeds.

6. A shift control apparatus for a continuously variable transmission as claimed in claim 5, wherein the shift speed calculating section calculates the shift speed ($V_{ratio}$) as follows: $V_{ratio} = \Delta Ratio = (Ratio - Ratioold)/\Delta t$, wherein $\Delta t$ denotes a predetermined calculation period, $Ratio = N_P/N_S$, $N_P$ denotes the primary revolution speed, $N_S$ denotes the secondary revolution speed, and Ratioold is Ratio before one predetermined calculation period.

7. A shift control apparatus for a continuously variable transmission, comprising:
a primary pulley;
a secondary pulley;
an endless belt wound on both of the primary and the secondary pulleys;
a shift ratio controlling section that controls a shift ratio between the primary pulley and the secondary pulley;
a shift speed detecting section that detects a shift speed, the shift speed being a variation quantity of the shift ratio per unit of time; and
a shift speed suppression section that suppresses an advance of a shift ratio control by the shift ratio controlling section to suppress the shift speed when a magnitude of the shift speed is equal to or larger than a predetermined value, the shift speed suppression section setting a suppression quantity to suppress the advance of the shift ratio control so as to suppress the shift speed,
wherein the shift speed suppression section comprises a shift speed suppression determining section that determines whether the magnitude of the shift speed is equal to or larger than a first threshold value which corresponds to the predetermined value and is smaller than an allowance value of the shift speed and outputs a first shift duty suppression signal when determining that the magnitude of the shift speed is equal to or larger than the first threshold value, determines whether the magnitude of the shift speed is equal to or larger than a second threshold value which is larger than the first threshold value but is smaller than the allowance value of the shift speed when the first shift duty suppression signal is outputted and outputs a second shift duty suppression signal when determining that the magnitude of the shift speed is equal to or larger than the second threshold value, and determines whether the magnitude of the shift speed is equal to or larger than a third threshold value which is larger than the second threshold value but is smaller than the allowance value of the shift speed when the second shift duty suppression signal is outputted and outputs a third shift duty suppression signal when determining that the magnitude of the shift speed is equal to or larger than the third threshold value.

8. A shift control apparatus for a continuously variable transmission as claimed in claim 7, wherein the shift control apparatus further comprises a PID section that outputs a feedback correction quantity ($D_F$) which is decreased in accordance with the magnitude of the shift speed.

9. A shift control apparatus for a continuously variable transmission as claimed in claim 8, wherein the PID control section carries out a correction for a deviation $\Delta N_p=(Npo-Np)$ between the actual primary revolution speed (Np) and a target primary revolution speed (Npo) using a PID control.

10. A shift control apparatus for a continuously variable transmission as claimed in claim 9, wherein the PID control section comprises: a proportional correction quantity calculating section that calculates a proportional feedback correction quantity ($D_{FP}$) using a proportional control for the deviation ($\Delta N_p$); an integration correction quantity calculating section that calculates an integration feedback correction quantity ($D_{FI}$) using an integration control for the deviation ($\Delta N_p$); a differential correction quantity calculating section that calculates a differential feedback correction quantity ($D_{FD}$) using a differential control for the deviation ($\Delta N_p$); and a first adder that adds the proportional feedback correction quantity ($D_{FP}$), the integration feedback correction quantity ($D_{FI}$), and the differential feedback correction quantity ($D_{FD}$) and the added result of the first adder being the feedback correction quantity ($D_F$).

11. A shift control apparatus for a continuously variable transmission as claimed in claim 10, wherein the shift control apparatus further comprises a second adder which adds the feedback correction quantity ($D_F$) from the PID control section to a shift reference duty ($D_{BASE}$) from a shift reference duty calculating section, the shift reference duty being a duty to supply a primary pulley pressure required to maintain the present shift ratio and the added result of the second adder being a shift duty ($D_D$) and outputted to the shift speed suppression section.

12. A shift control apparatus for a continuously variable transmission as claimed in claim 11, wherein the shift speed suppression section multiplies the shift duty ($D_D$) from the second adder with a predetermined coefficient to calculate an actual shift duty (D) and outputs the actual shift duty (D) to a shift control purpose solenoid of a flow quantity control valve, the predetermined coefficient being set in accordance with the shift speed.

13. A shift control apparatus for a continuously variable transmission as claimed in claim 12, wherein the shift speed suppression section sets the predetermined coefficient according to the first, second, and third shift duty suppression signals.

14. A shift control apparatus for a continuously variable transmission as claimed in claim 13, wherein the PID control section, when the first shift duty suppression signal is inputted, multiplies an addition value of the respective feedback correction quantities with a first correction gain ($J_1$; $0<J_1<1$) to be outputted as the feedback correction quantity $D_F$, when the second shift duty suppression signal is inputted, multiplies the addition value of the respective feedback correction quantities with a second correction gain ($J_2<J_1$, $0<J_2<1$) to be outputted as the feedback correction quantity $D_F$, and, when the third shift duty suppression signal is inputted, multiplies the addition value with a third correction gain $J_3$ ($J_3<J_2$, $0<J_3<1$) to be outputted as the feedback correction quantity $D_F$.

15. A shift control apparatus for a continuously variable transmission as claimed in claim 14, wherein the shift speed suppression section, when no shift duty suppression signal is inputted, multiplies the shift duty ($D_D$) with a predetermined ordinary coefficient ($K_0$) to calculate the actual shift duty (D) ($D=K_0 \times D_D$), when the first shift duty suppression signal is inputted, multiplies the shift duty ($D_D$) with a first coefficient ($K_1$) which is smaller than the predetermined ordinary coefficient to calculate the actual shift duty (D) ($D=K_1 \times D_D$), when the second shift duty suppression signal is inputted, multiplies the shift duty ($D_D$) with a second coefficient ($K_2$) which is smaller than the first coefficient to calculate the actual shift duty (D) ($D=K_2 \times D_D$), and, when the third shift duty suppression signal is inputted, multiplies the shift duty ($D_D$) with a third coefficient ($K_3$) which is smaller than the second coefficient to calculate the actual shift duty (D) ($D=K_3 \times D_D$).

* * * * *